(12) United States Patent
Martin et al.

(10) Patent No.: US 11,879,938 B2
(45) Date of Patent: Jan. 23, 2024

(54) METHOD FOR DETECTING PERTURBATIONS IN A LOGIC CIRCUIT AND LOGIC CIRCUIT FOR IMPLEMENTING THIS METHOD

(71) Applicant: Nagravision Sarl, Cheseaux-sur-Lausanne (CH)

(72) Inventors: Jean-Marie Martin, Cheseaux-sur-Lausanne (CH); Roan Hautier, Cheseaux-sur-Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 40 days.

(21) Appl. No.: 17/788,260

(22) PCT Filed: Dec. 21, 2020

(86) PCT No.: PCT/EP2020/087397
§ 371 (c)(1),
(2) Date: Jun. 22, 2022

(87) PCT Pub. No.: WO2021/130153
PCT Pub. Date: Jul. 1, 2021

(65) Prior Publication Data
US 2023/0027416 A1   Jan. 26, 2023

(30) Foreign Application Priority Data
Dec. 23, 2019   (EP) .................. 19219480

(51) Int. Cl.
*G01R 31/317*   (2006.01)
*G06F 21/75*   (2013.01)

(52) U.S. Cl.
CPC . *G01R 31/31721* (2013.01); *G01R 31/31719* (2013.01); *G06F 21/755* (2017.08)

(58) Field of Classification Search
CPC ........ G01R 31/31721; G01R 31/31719; G06F 21/755; G06F 21/75; H04L 9/004
See application file for complete search history.

(56) References Cited

U.S. PATENT DOCUMENTS

| 2015/0137864 A1 | 5/2015 | Whatmough et al. |
| 2017/0030954 A1 | 2/2017 | Whatmough et al. |
| (Continued) | | |

FOREIGN PATENT DOCUMENTS

| EP | 3 220 376 A1 | 9/2017 |
| EP | 3 415 937 A1 | 12/2018 |

OTHER PUBLICATIONS

Gomina Kamil et al., "Power supply glitch attacks: Design and evaluation of detection circuits", 2014 IEEE International Symposium on Hardware-Oriented Security and Trust (HOST), May 6, 2014 (May 6, 2014), pp. 136-141 (Year: 2014).*

(Continued)

*Primary Examiner* — April Y Blair
*Assistant Examiner* — Rong Tang
(74) *Attorney, Agent, or Firm* — Oblon, McClelland, Maier & Neustadt, L.L.P.

(57) ABSTRACT

A method for detecting perturbations in a logic circuit including a plurality of datapaths coordinated by a clock signal and at least one test circuit having a programmable length datapath for varying a test propagation delay. The test circuit further including inputs, an output and an error generator for providing an error in case that the output is different than an expected output for the inputs. The test circuit having a calibration mode including determining a critical propagation delay by varying the programmable length datapath until the error generator outputs an error, adjusting the programmable length datapath to include therein a tolerance delay, and switching into a detection mode configured to detect a perturbation in the logic circuit (Continued)

along the programmable length datapath in case the error generator outputs an error.

13 Claims, 5 Drawing Sheets

(56)  References Cited

U.S. PATENT DOCUMENTS

2017/0262630 A1  9/2017  Teper et al.
2020/0209309 A1  7/2020  Martin

OTHER PUBLICATIONS

International Search Report dated Mar. 23, 2021 in PCT/EP2020/087397, filed on Dec. 21, 20220, 4 pages.
European Search Report dated Jun. 23, 2020 in EP application 19219480.1, filed on Dec. 23, 2019, 3 pages.
Gomina et al. "Power supply glitch attacks: design and evaluation of detection circuits", 2014 IEEE International Symposium on Hardware-Oriented Security and Trust (HOST), May 6, 2014, pp. 136-141, XP032620090.
Bowman et al. "A 45nm Resilient Microprocessor Core for Dynamic Variation Tolerance", IEEE Journal of Solid-State Circuits, vol. 46, No. 1, Jan. 2011, pp. 194-208, XP00279900.

\* cited by examiner

METHOD FOR DETECTING PERTURBATIONS IN A LOGIC CIRCUIT AND LOGIC CIRCUIT FOR IMPLEMENTING THIS METHOD

TECHNICAL FIELD

The present disclosure relates to the field of electronic circuits, in particular integrated circuits in which there is an interest to monitor a digital signal, such as a digital power supply, to detect perturbations that may be caused by side-channel attacks.

BACKGROUND

Side-channel attacks are based on signals gained from the material execution of algorithms, e.g. power consumption, timing data or electromagnetic leaks, instead of relying on weaknesses of the algorithms themselves. In computer security, they raise a significant risk of having secret information fraudulently retrieved, all the more since they are usually non-intrusive and undetectable. In this respect, even strongest cryptography algorithms are subject to being discreetly analyzed and identified from outside.

Such side-channel attacks can notably rely on power analysis, consisting in studying the power consumption of a hardware device, implementations of which include SPA for "Simple Power Analysis" (visually interpreting power traces) and DPA for "Differential Power Analysis" (exploiting statistical analysis of collected data).

A number of hardware and digital solutions have been developed over years for preventing those attacks or making them unsuccessful. Some of them are based on decreasing as much as possible intensities of released signals relevant to key operations. Though being able to reduce significantly related risks, appropriate means require dedicated material implementations, which may be costly and complex, and cannot fully prevent signal leakage.

Other solutions are based on purposely generating noise in the perceptible signals so as to blind hackers to meaningful reverse analysis information, which can be done notably by randomly introducing timing modifications (clock domains, jitter), amplitude modifications (filters, noise engines) or by dynamic reconfigurations.

Those solutions, however, may lead to material execution failures, due in particular to glitches, i.e. short-lived system faults, which are usually more difficult to troubleshoot than e.g. software bugs. Those may notably include time violations.

A non-patent literature document entitled "Power supply glitch attacks: Design and evaluation of detection circuits" (Gomina Kamil et al.), relates to designs and evaluations of detection circuits developed against power supply glitch attacks. This document provides a background regarding timing paths in a synchronous circuit and sensitivity of logic gates towards power glitches. It defines the constraints necessary for a proper detection and presents three detection methodologies and comparisons based on simulation results.

Another non-patent literature document entitled "A 45 nm Resilient Microprocessor Core for Dynamic Variation Tolerance" (Keith A. Bowman et al.), discloses a microprocessor core integrating resilient error-detection and recovery circuits to mitigate the clock frequency guardbands for dynamic parameter variations to improve throughput and energy efficiency.

Document US 2015/137864 A1 discloses a circuit delay monitoring apparatus comprising a ring oscillator with a plurality of delay elements and a series of sampling points which are provided, one in association with the output of each of the delay elements, with those sampling points providing an input to associated flip flops within the sampling circuitry.

Document US 2017/030954 A1 relates to an apparatus and method for detecting a resonant frequency giving rise to an impedance peak in a power delivery network.

Accordingly there is a need for improving methods and systems for preventing side-channel attacks in logic circuits, in order to at least partially overcome the aforementioned issues and drawbacks.

SUMMARY OF THE SOLUTION

To address this concern, the present disclosure suggests, as a first aspect, a method for detecting perturbations in a logic circuit configured for processing data operations along a plurality of datapaths coordinated by a clock signal and among which at least one datapath has an operating propagation delay. This logic circuit further comprises at least one test circuit having a programmable length datapath for varying a test propagation delay. This test circuit further comprises inputs, to be processed to provide an output at an instant depending on the programmable length datapath, and an error generator for providing an error in case that the output is different than an expected output for said inputs further to an inappropriate programmable length datapath setting or a perturbation in the logic circuit. Furthermore, this test circuit is configured to operate in two modes, namely a calibration mode and a detection mode, so as repeatedly switching between these two modes.

The calibration mode comprises:
determining a critical propagation delay by varying the programmable length datapath until the error generator outputs an error,
adjusting the programmable length datapath to include therein a tolerance delay, and
switching into detection mode.

The detection mode comprises:
detecting a perturbation in the logic circuit along the programmable length datapath in case the error generator outputs an error.

Thanks to the present solution, any perturbation, such as glitches, that would be voluntarily introduced on a digital signal of a logic circuit can be efficiently detected. In addition, such detection remains efficient whatever the variations of the process, the variations of the voltage and the variations of the temperature of the logic circuit. As further significant advantage, this circuit can be limited to comprise fully digital components, thus providing benefits at least in terms of size, power consumption, development and cost price. In a more practical way, the present solution has a significant interest for smart cards, for example, where the space to implement tamper resistant solutions or to improve such solutions is especially limited.

According to a specific embodiment, the logic circuit further comprises a second test circuit, the second test circuit having at least the same capabilities as the first test circuit (i.e. the other test circuit). Furthermore, when one test circuit is in one mode (i.e. calibration or detection mode), the other one is in the other mode.

According to a preferred embodiment, varying the programmable length datapath of the test circuit, for determining the critical propagation delay, is stopped before this critical propagation delay is lower than a minimum delay required for processing the data operations without perturbation or disturbance.

According to another preferred embodiment, the method comprises iterations for iterating over time the calibration and detection modes, namely for iterating over time the determining, adjusting, switching and detecting steps.

Preferably, the programmable length datapath of the test circuit is formed by a plurality of elements to be included within one clock cycle. Still preferably, these elements are included according to a constant number during first iterations, before increasing the number of elements to be included at next iterations.

In one embodiment, switching from the calibration mode to the detection mode is performed as soon as the calibration mode is completed.

According to a preferred embodiment, the inputs of the test circuit are swapped or changed at each clock cycle in order to get different outputs between two successive clock cycles.

Preferably, the operating propagation delay within the datapath is adjusted by applying a useful skew to a clock branch coordinating the datapath generating this operating propagation delay.

According to a second aspect, the present disclosure also relates to a logic circuit for implementing the method according to any of the embodiments or variants disclosed therein, while processing data operations along a plurality of datapaths coordinated by a clock signal. This logic circuit comprises at least one test circuit and said test circuit comprises means for switching calibration mode into detection mode and for switching detection mode into calibration mode.

More specifically, the aforementioned test circuit is configured to operate according to the calibration mode and the detection mode, the calibration mode being designed to determine a critical propagation delay of a digital signal through at least one of the datapaths, and the detection mode being designed to detect a perturbation in the logic circuit. Furthermore, the test circuit comprises:
  first registers configured to be loaded with inputs,
  a logic unit storing a function configured to provide an output from the inputs,
  second registers for storing expected outputs provided by the function for the aforementioned inputs,
  a comparator configured to verify whether the output is equal to one of the expected outputs,
  an error generator for outputting an error in case the comparator provides a negative event,
  a programmable length datapath for varying a propagation delay of the digital signal allowing to get the output from the input, and
  a switching unit for switching the calibration mode into the detection mode and for switching the detection mode into the calibration mode.

According to a preferred embodiment, the logic circuit further comprises a second test circuit, these two test circuits having at least similar capabilities to perform at least the same tasks. Furthermore, these test circuits are configured for simultaneously working in one of the calibration mode and detection mode, so that when one of these test circuits work in one mode, the other test circuit works in the other mode.

Still preferably, the programmable length datapath comprises a plurality of selectable delay cells.

According to another preferred embodiment, the logic circuit is limited to comprise fully digital components.

Other embodiments and advantages will be disclosed hereafter in the detailed description.

BRIEF DESCRIPTION OF THE DRAWINGS

The solution and the embodiments suggested in the present disclosure should be taken as non-limitative examples and will be better understood with reference to the attached Figures in which.

Figure 1:
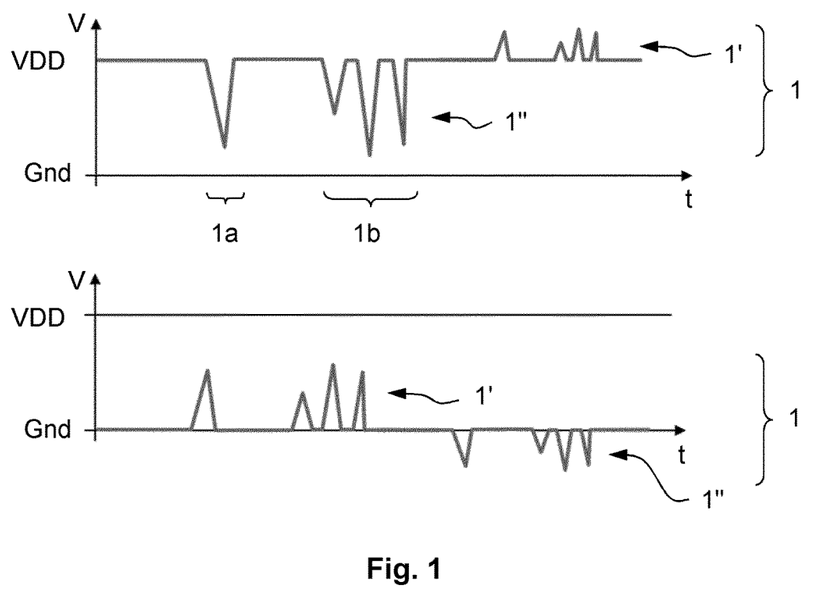
FIG. 1 schematically depicts different types of glitches usually known in glitch attacks.

FIG. 1 shows some examples of different kinds of glitches 1 which are presented in the present description as example of perturbations or disturbances which may be used by hackers in side-channel attacks, especially in so-called glitch attacks. Glitches 1 can occur e.g. on the power supply (VDD) of an integrated circuit powered by a DC power supply, as shown in the upper graph of FIG. 1, or on the ground (GND), as shown in the lower graph of this Figure. Glitches 1 can refer to single spikes 1a, or can occur in a series of successive spikes 1b which do not necessarily have the same amplitude. As shown in FIG. 1, glitches 1 can be positive 1' or negative 1".

Glitches 1 should not be confused with noise that may occur in an electrical signal. Small variations, e.g. ±10% of the nominal value or voltage, of the electrical signal should be considered as noise due to the insignificant impact that such small variations may have on the logic circuit. Beyond the admitted range assigned to noise, the variations may be considered as glitches or common glitches. Similarly, glitches may have a minimum width in order to have a sufficient impact through the electrical signal. This minimum width can be considered, for example, as being of the order of 2-3 ns.

The effects of glitches e.g. on a power supply of a logic circuit may be different depending on the type of the elements of the logic circuit. In this regard, a distinction should be made between sequential logic and combinational logic. In combinational logic, the state of the output(s) at a given moment depends only on the circuit and on the value of the inputs at that instant. In contrast, in sequential logic the state of the output(s) of the circuit at the given instant depends on the value of the inputs at that instant and the value of the output(s) at the previous instants. In other words, the sequential logic uses the notion of storage memory, whereas the combinational logic does not have such a notion. Such a notion is obtained in the sequential logic by flip-flops, whereas the basic element of the combinational logic is the logic gate, e.g. AND, OR, XOR or NOT gates.

In addition, there are two main categories of flip-flops: some are asynchronous with respect to the clock signal and are called latches, whereas the others are synchronous with respect to the clock signal and are simply called flip-flops. Today, nearly all sequential logics are clocked or synchronous logics. This is the reason why the present description will specifically refer to synchronous circuits, namely circuits whose elements change their state in synchronism with the clock signal under normal conditions.

It has been assessed that glitches have a limited effect on sequential elements, especially on synchronous sequential elements because flip-flops can only be affected in the vicinity of a clock edge event. Since this sensitive instant corresponds to a rising or falling edge of the clock signal, it is very limited in time, contrary to the period of the clock signal.

In contrast, the glitches have much more impact on combinational elements, e.g. logic gates, since they can change the result of Boolean operation due to the variation of the delay cells. The effects of a glitch occurring on the power supply of combinational elements are quite complex. Nevertheless, they can be summarized as follows:

When a positive glitch 1' occurs on the power supply VDD or when a negative glitch 1" occurs on the ground GND, the delay of the logic element supplied in this way is accelerated.

When a negative glitch 1" occurs on the power supply VDD or when a positive glitch 1' occurs on the ground GND, the delay of the logic element supplied in this way is slow down.

Figure 2:
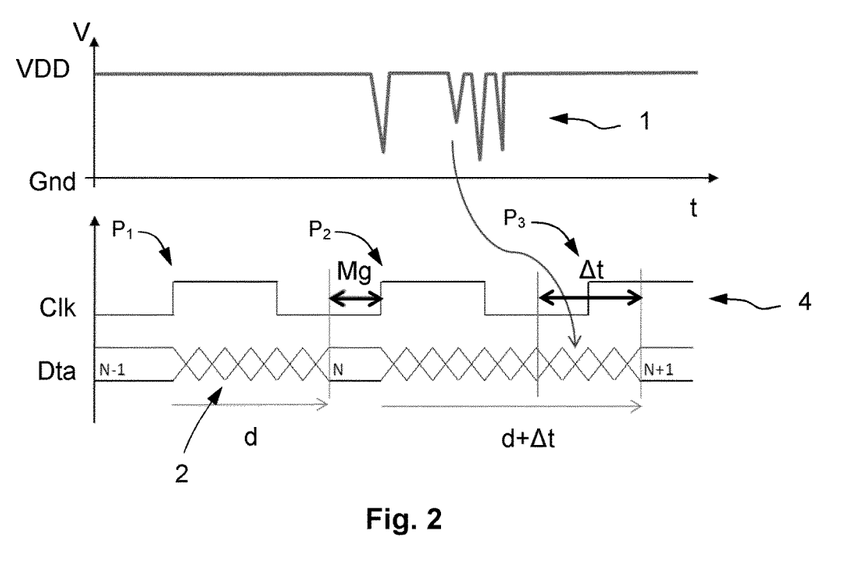
FIG. 2 illustrates an example of a glitch effect on a synchronous logic circuit.

By way of example, FIG. 2 shows the impact of glitches 1 on a synchronous design. The upper part of FIG. 2 shows a single glitch 1a and a series of glitches 1b occurring on the power supply of a synchronous circuit comprising flip-flops. In correspondence with this upper part, the lower part of FIG. 2 shows the clock signal 4 Clk and the datapath Dta of a digital signal 2 along the time axis t of the upper part. Boolean results N−1, N and N+1 are successively provided at the output of successive flip-flops. The operations to calculate the Boolean result N generates the digital signal 2 which is represented by zigzag line and which typically starts at a first clock pulse P1 and ends at the end of a normal delay d.

One can see that when the second clock pulse P2 is rising, the Boolean result N is done and stable. This is shown through the safe margin Mg setup between the Boolean result N and the second clock pulse P2. However, once the glitches 1a, 1b occur, they slow down the combinational logic between the two successive flip-flops as shown by the abnormally longer delay d+Δt required for providing the Boolean result N+1. Consequently, when the third clock pulse P3 is rising for capturing the Boolean result in accordance with a synchronous design, the result is captured before its operation ends properly. It generates a time violation which may create a malfunction of the circuit or a local metastability inside the circuit. Metastability can be regarded as the ability, for a digital electronics circuit, to persist for an unknown duration in an unstable equilibrium due to the fact that it remains unable to decide what to do with its input signals.

Figure 3:
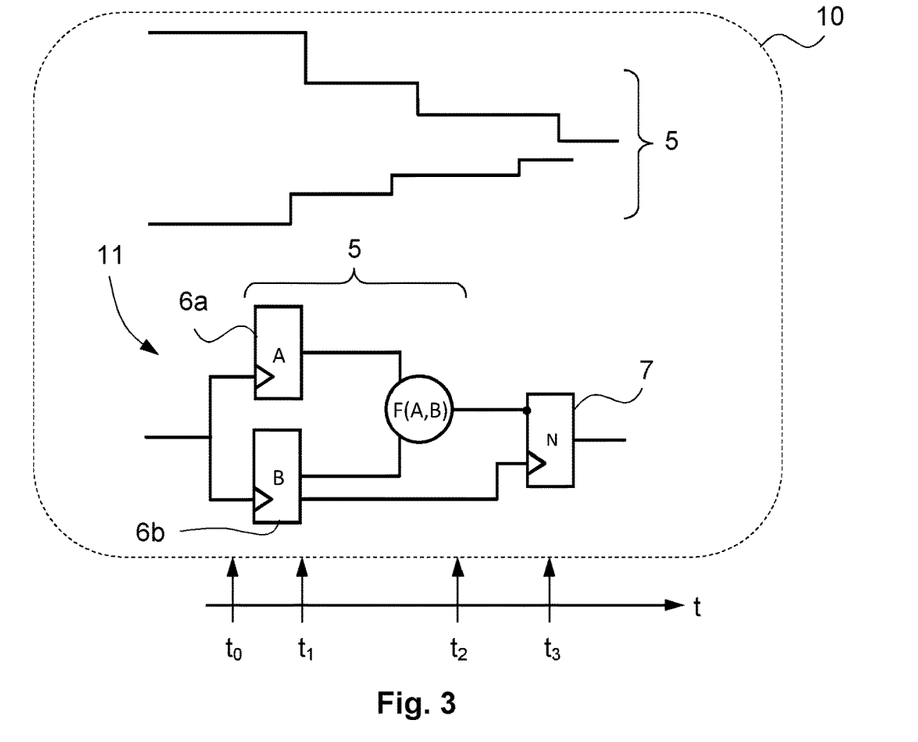
FIG. 3 is a diagram of a part of a logic circuit.

Referring to FIG. 3, it shows a plurality of datapaths 5 within a logic circuit 10. The two upper datapaths 5 are each schematized by a continuous stepped shape line, whereas the datapath 5 shown in the central part of this FIG. 3 belongs to a more detailed portion 11 of the logic circuit 10. Accordingly, the logic circuit 10 is schematized by a dashed line surrounding the aforementioned portion 11 and data-paths 5. This portion 11 may typically be used as exemplary circuit in the method or logic circuit of the present solution. For this reason, this portion is also referred to as exemplary circuit 11. Although the logic circuit 10 depicted in FIG. 3 comprises the exemplary circuit 11, it should be understood that any other logic circuit 10 may comprise different circuits, i.e. there is no requirement for any other logic circuit 10 to comprise the exemplary circuit 11 shown in FIG. 3.

Although it may be more complicated, the exemplary circuit 11 suggested in the example of FIG. 3 is very simple given that it comprises two registers 6a, 6b, each of which may include an operand A or B. The exemplary circuit 11 further comprises a function F which is configured to perform a computation using both operands A and B. This function relates to a more or less complex calculation. Preferably, the function F is configured so that the result of F(A, B) is different from the result provided by F(B, A). In other words, the function F preferably provides two different results when the operands are swapped.

Preferably, the exemplary circuit further comprises a last register 7 to write therein the Boolean result N from the function F. Given that the exemplary circuit works in synchronism with the clock signal 4, the following time marks should be noted. At time $t_0$, the operands A and B are loaded in the registers 6a, 6b. At time $t_1$, these operands are released from the registers 6a, 6b. Releasing the operands typically occurs at the beginning of the clock period T, typically at a rising edge of the clock, for example at pulse P1 (FIG. 2). At time $t_2$, the function F has calculated the Boolean result N using the two operands A, B as inputs provided by the registers 6a, 6b. The Boolean result N can be regarded as being the output provided by the exemplary circuit 11. This output is written in the last register 7, or captured by this last register 7, at time $t_3$. Therefore, writing this result N is done at the end of the clock period T, namely at the next rising edge of the clock which, in such a synchronous design, corresponds to pulse P2 (FIG. 2). The datapath 5 travelled by the digital signal during a clock period T within the exemplary circuit 11 is shown by the horizontal curly brace 5 in FIG. 3.

Figure 4:
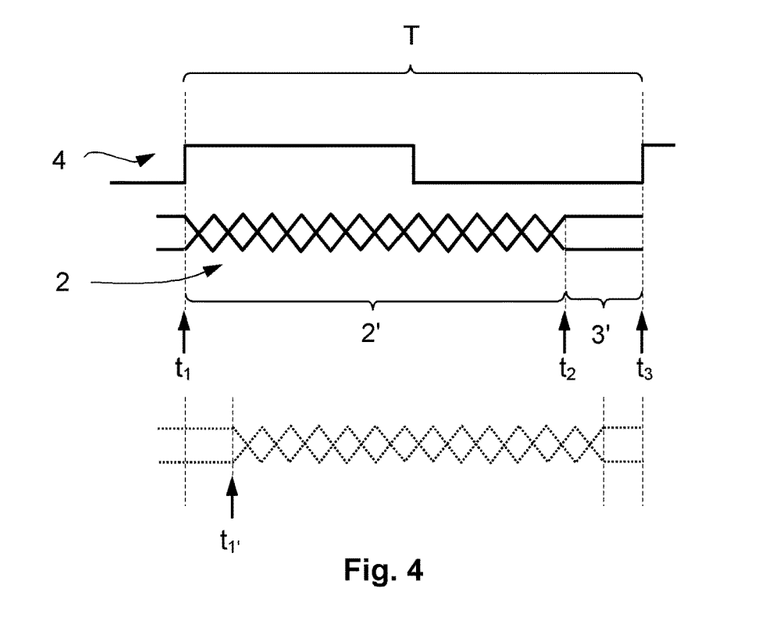
FIG. 4 is representation of a the propagation of a digital signal through the logic circuit of FIG. 3 in correlation with a clock signal.

Referring now to FIG. 4, the latter illustrates the propagation of the digital signal 2 through the logic circuit, more specifically through the exemplary circuit 11 of FIG. 3.

This digital signal propagation is shown in correlation with the clock signal 4, in compliance with a synchronous exemplary circuit in which flip-flops change their state in synchronism with the clock signal (under normal conditions). On FIG. 4, one can show that the digital signal 2 starts at the rising edge of the clock signal 4 (i.e. at time $t_1$) and that it is stabilized before the end of the clock period T, more specifically at time $t_2$. It means that at time $t_2$ the Boolean result N is completed and is waiting for being written in the last register 7 at the next rising edge of the clock, namely at time $t_3$. The time interval between $t_2$ and $t_1$ corresponds to the propagation delay 2' of the digital signal 2 through the datapath 5 of the exemplary circuit 11, and the time interval between times $t_3$ and $t_2$ can be regarded as a tolerance delay 3', a margin or an empty slack.

If a perturbation 1, such as a glitch 1", occurs before the digital signal 2 is stabilized, i.e. before the Boolean result N is completed, the propagation delay 2' will be increased by an additional time Δt, as explained in connection with FIG. 2. However, if this additional time Δt is smaller than the tolerance delay 3', the exemplary circuit will not be affected by the perturbation 1 because the digital signal reaches a stabilized state before the end of the clock period T. Similarly, if the perturbation 1 occurs during the tolerance delay 3', the exemplary circuit 11 remains unaffected by such a perturbation. Accordingly, the exemplary circuit 11 may include "shadow areas" that render such a circuit inefficient to detect perturbations in a reliable manner.

The tolerance delay 3' (FIG. 4) or margin Mg (FIG. 2) is usually defined according to the worst case scenario (WCS) of the logic circuit and for a given clock frequency. The WCS mainly depends on so-called Process-Voltage-Temperature (PVT) working conditions which has an impact on the timing assigned to the datapath of the logic circuit.

Within the PVT acronym, the process P models the timing impact of the small blocks of semiconducting material (such as integrated circuits, chips or microchips) on which a given functional circuit is fabricated. Such an impact is related to the manufacturing process of the integrated circuit and may vary depending on manufacturing process conditions. The voltage V of the PVT acronym refers to small voltage variations of the power supply applied to the semiconductor. Indeed, the higher the voltage, the higher the current, which reduces delays of the flip-flops and therefore accelerates the computation of the logical operations. The ambient temperature T is also a parameter that has an impact on the timing of the semiconductor.

To ensure that a logic circuit (e.g. the exemplary circuit) will be able to perform the computation of the related operations for which it is designed, the designer must consider the WCS of the components of this circuit in order to ensure that operating propagation delay required by the circuit is smaller than the clock period T, thus avoiding any time violation.

Figure 5:
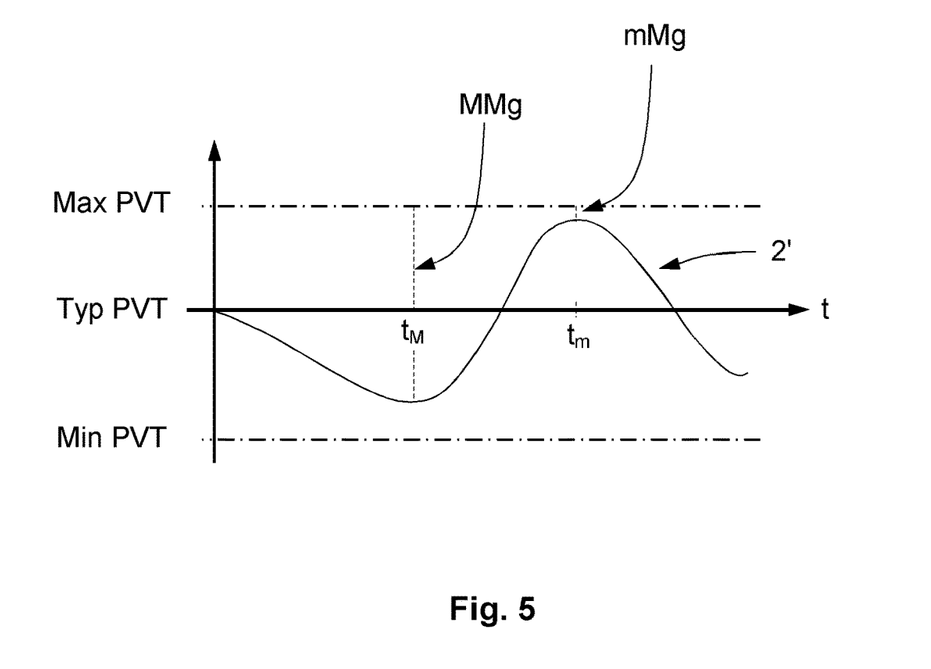
FIG. 5 is diagram showing the variation of the timing margin of the logic circuit of FIG. 3 under different scenarios, especially PVT model variations.

FIG. 5 is diagram showing the variations of the timing margin Mg of the exemplary circuit shown in FIG. 3 under different scenarios, especially under the PVT model variations. On this figure, the time t is represented on the x-axis and the PVT values are represented on the y-axis between a minimum PVT value and a maximum PVT value. The time axis crosses the y-axis at so-called typical PVT value which may be regarded as a median common value of the PVT parameter. The minimum PVT value can be mapped to the Best Case Scenario (BCS), whereas the maximum PVT value can be mapped to the Worst Case Scenario (WCS). Referring to the exemplary circuit 11, the curve of this graph may be regarded as showing the variations of the propagation delay 2' along the time. Accordingly, the timing margin Mg, shown in FIG. 5 between the curve 2' and the Max PVT limit, may be regarded as the tolerance delay 3'. One can note that the timing margin Mg varies between a maximum margin MMg and a minimum margin mMg. In order to avoid any time violation, the curve showing the propagation delay 2' of the digital signal 2 within the exemplary circuit does not exceed the Max PVT limit (WCS).

Via the curve 2', FIG. 5 shows that the timing margin Mg (i.e. the empty slack or tolerance delay 3') is not constant but depends on the PVT parameters. It means that if a side-channel attack occurs in the vicinity of the time $t_M$, there is a significant risk that the perturbation 1 appears in the time interval where the timing margin Mg is important, with the result that the exemplary circuit 11 will be unaffected by such an attack. Given that the variations of the curve 2' remains unpredictable over the time, on can understand that it is very difficult to efficiently prevent side-channel attacks. In addition, since the temperature is one of the parameters of the PVT, a malicious person may voluntarily acts on the ambient temperature of a logic circuit in order to place such a circuit within better conditions for performing side-channel attacks at his advantage.

Figure 6:
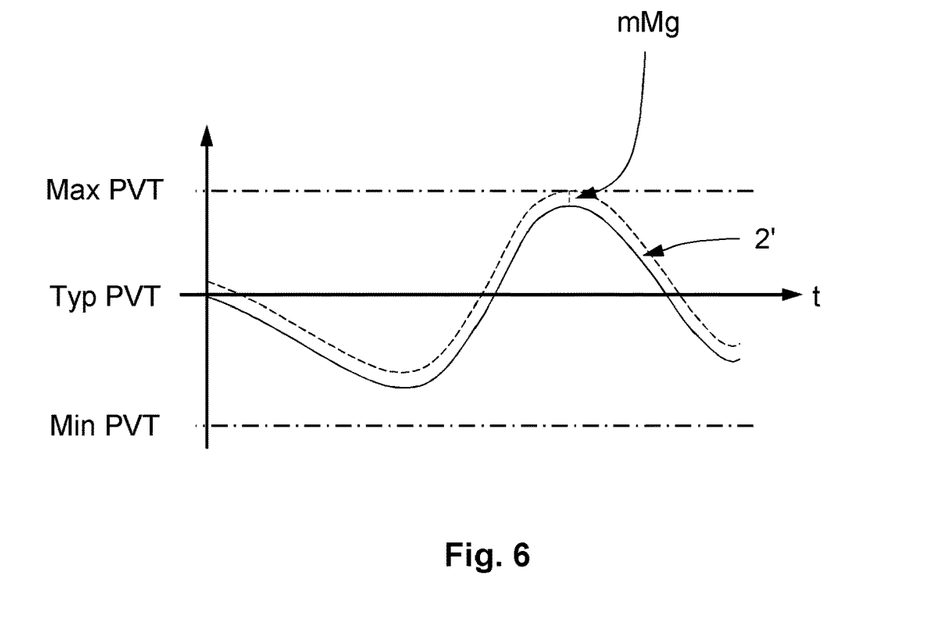
FIG. 6 is a diagram, similar to that of FIG. 5, showing the time margin of the logic circuit working in accordance with the method suggested in the present solution.

In order to solve this tricky issue, the present solution is based on a new approach that is schematically illustrated at FIG. 6. Instead of having a constant or static margin level located at the Max PVT limit, the present solution suggests to provide a dynamic margin that follows the curve 2' as shown in FIG. 6. Thanks to this dynamic margin, the timing margin Mg or tolerance delay 3' remains constant, or almost constant, over the time t and may be set at a value equal or close to the minimum margin mMg. Under such conditions, the relevant part of the logic circuit used for detecting perturbations becomes more sensitive and much more efficient for detecting glitch attacks for instance.

As shown in FIG. 6, one of the aims of the present solution is to provide adaptive or dynamic detecting means able to follow the variation of the PVT parameters as well as the clock frequency. The propagation delay 2' of the digital signal within the circuit designed for detecting perturbations is made variable so as to reach a critical limit that corresponds or that is close to the period T of the clock signal 4. In other words, one of the goals of the present solution is to minimize the empty slack or tolerance delay 3' in a dynamic manner, so as to maintain this tolerance delay 3' at a minimum value whatever the current PVT parameters.

To this end, the exemplary circuit 11 is modified in order to have a datapath 5 whose length is programmable. Accordingly, the propagation delay 2' of the digital signal 2 travelling through such a datapath is made adjustable. In the further description, the exemplary circuit thus modified is referred to as test circuit 21, 21' and is schematically depicted in FIGS. 8 and 9.

Figure 7:
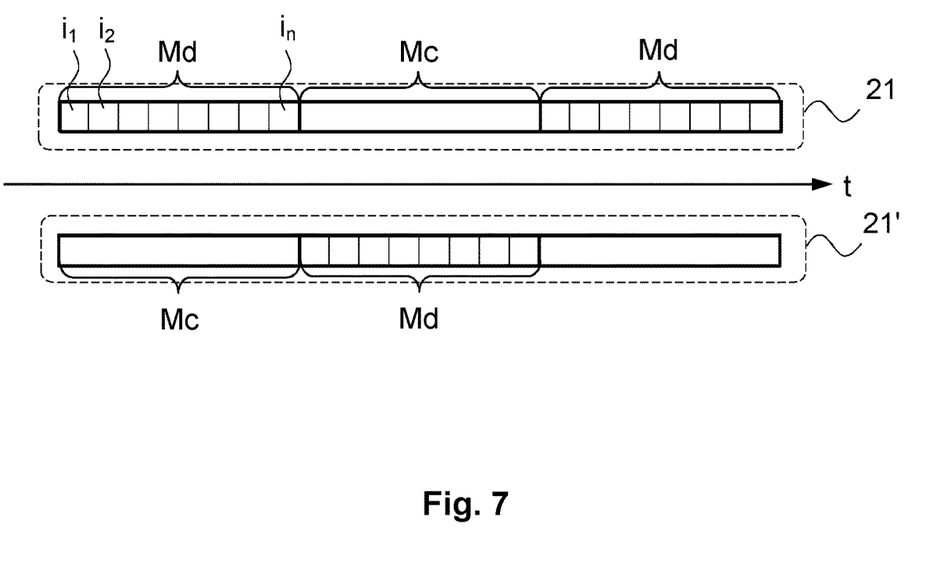
FIG. 7 is schematic representation showing calibration and detection modes swapping.

In addition, this test circuit 21, 21' is intended to operate in two modes, namely a calibration mode Mc and a detection mode Md, both schematized in FIG. 7. The calibration mode Mc is an operating mode in which the test circuit 21, 21' is switched in a calibration phase in order to modify its variable tolerance delay 3' in accordance with the current PVT parameters. In the present disclosure, this is preferably achieved by adjusting the length of the datapath, so that the tolerance delay 3' remains as close as possible to a constant minimum margin mMg. The detection mode Md is a second operating mode in which the test circuit 21, 21' mainly works for detecting any side-channel attack. The test circuit 21, 21' is schematically represented in FIG. 7 using a dashed-line surrounding the calibration and detection modes which are successively swapped along the time axis t.

Figure 8:
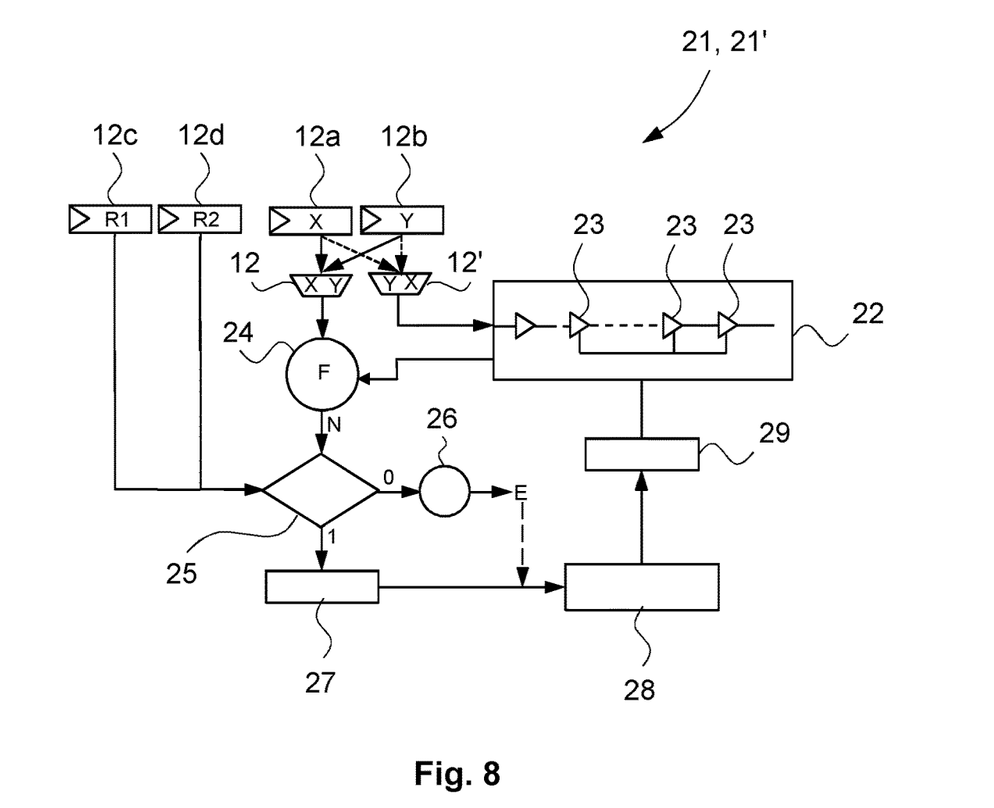
FIGS. 8 and 9 show how the present solution is achieved according to two different architectures.
Figure 9:
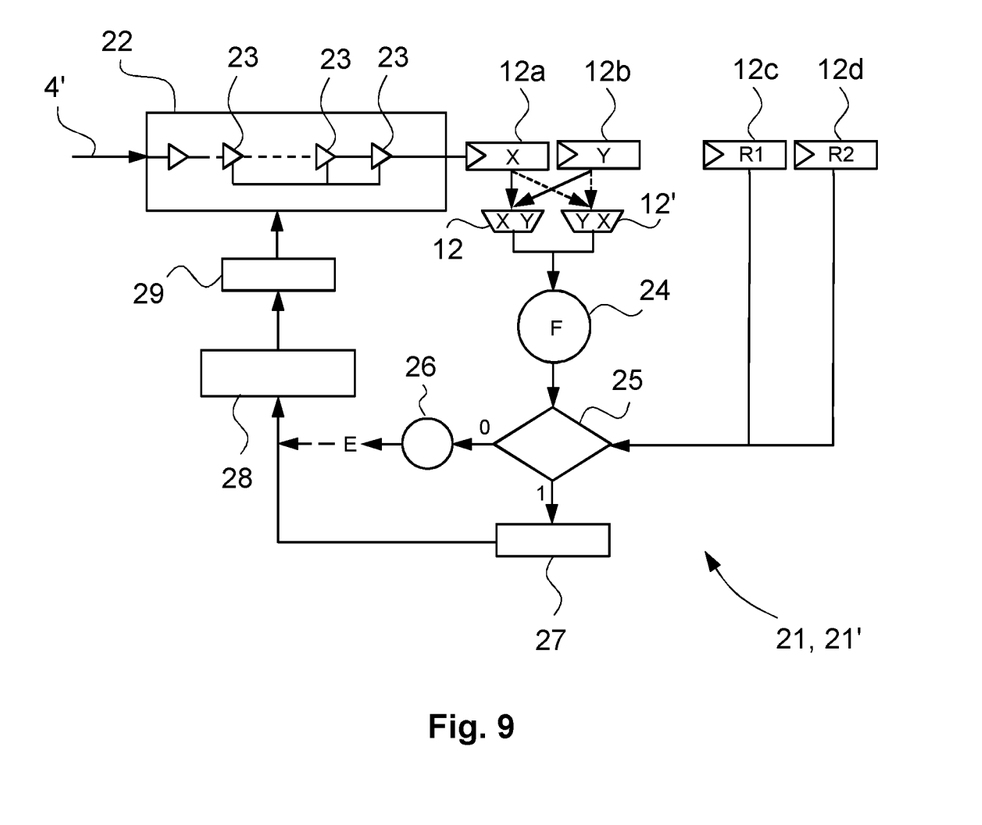

FIGS. 8 and 9 show how the present solution may be achieved according to two different architectures given here as examples.

Referring to the aforementioned Figures, the first aspect of the present solution relates to a method for detecting perturbations 1 in a logic circuit 10 for processing data operations along a plurality of datapaths 5 coordinated by a clock signal 4. At least one datapath 5 has an operating propagation delay. The logic circuit may comprise logic gates such as flip-flops or latches and the datapaths defined by the digital elements may further include registers and buses. More specifically, the logic circuit 10 further comprises at least one test circuit 21, 21' (FIGS. 7-8) having a programmable length datapath 22 for varying a propagation delay 2'. Since this propagation delay relates to the test circuit 21, 21', it is further referred to as test propagation delay 2'. As schematized in FIGS. 7 and 8, the programmable length datapath 22 may be obtained from a plurality of elements 23, such as delay cells, whose number may be selected in order to vary the datapath length, namely to extend or shorten the length of the datapath belonging to the test circuit 21, 21'.

The test circuit 21, 21' also comprises at least two inputs X, Y to be processed to provide an output N at an instant depending on the programmable length datapath 22, more specifically on the length or time duration that this datapath represents. In this regard, it should be noted that there is no particular relationship between the output N of FIGS. 8-9 and the result N of FIG. 3, even if they may appear similar. The inputs X, Y may be regarded as operands loaded in at least two registers 12a, 12b. The output N corresponds to the result provided by a function F using the aforementioned inputs X, Y as operands in the computation of this function F. This function may be stored and run in a dedicated logic unit 24. The test circuit 21, 21' is set up to use at least two expected results R1, R2 that may be stored in appropriate registers 12c, 12d. Preferably, these expected results R1, R2 have been determined in advance on the basis of the inputs X, Y and the function F. More specifically, the expected result R1 corresponds to the result provided by the function F(X, Y), which uses the inputs in a first order, whereas the expected result R2 corresponds to the result provided by the function F(Y, X), namely the same function F but using the inputs in a second order. Accordingly, the function preferably does not relate to a commutative operation, so that if the operands X, Y are swapped, the result N provided by the function F also changes. Furthermore, the function F can be more or less complex, so that the expected results R1, R2 may typically be difficult to anticipate.

As schematized on FIGS. 7-8, the test circuit 21, 21' further comprises a comparator 25 and an error generator 26 that provides an error E (i.e. an error signal or value) in case where the output N is different than an expected output R1, R2 for inputs X, Y. The comparator 25 may typically determine that the output N is different than the expected output R1, R2 (i.e. determine that N≠R1 or N≠R2) further to a perturbation in the logic circuit 10 or an inappropriate programmable length datapath setting, namely further to a programmable length datapath setting that causes a time violation. This may occur e.g. in the case where the length of this datapath is too long or to short for providing the output N in time. Accordingly, the comparator 25 comprises a test function aiming to verify if the result N, e.g. the result of F(X, Y), is equal to the expected result R1. In case of positive event (shown through the binary output 1), the method is continued, whereas in case of negative event (binary output 0), the process is configured to provide an error E at the output of the error generator 26.

As mentioned above in connection with FIG. 7, the test circuit 21, 21' is configured to operate in two modes, namely in accordance with a calibration mode Mc and a detection mode Md, so as repeatedly switching between these modes Mc, Md, thus allowing to frequently update the detection mode Md (i.e. the setting of this mode) thanks or on the basis of the calibration mode Mc. Accordingly, it becomes possible to obtain a dynamic margin that remains constant or substantially constant as shown in FIG. 6. This dynamic margin corresponds to the time interval between the delivery of the output N and the next clock pulse of the clock signal 4, in particular the next rising edge of the clock signal 4. The calibration mode Mc comprises the following steps:
  determining a critical propagation delay by varying the programmable length datapath 22 until the error generator 26 outputs an error E, and
  adjusting the programmable length datapath 22 to include therein a tolerance delay 3'.

Accordingly, it should be noted that the variation of the length datapath is used to determine (i.e. to find or to discover as a result of investigations) the critical propagation delay, and as long as the error generator does not output an error, the programmable length datapath continues to be varied. Besides, the aforementioned margin is not only dynamic but is also minimized so that it may be referred to as a constant minimum margin.

On the other hand, the detection mode Md comprises a step for detecting a perturbation 1 in the logic circuit 10 along the programmable length datapath 22 in case the error generator 26 outputs an error E.

It should be noted that the two operating modes Mc, Md relate to normal operating modes (or working modes) of the test circuit 21, 21'. Accordingly, none of these modes should be regarded as a special mode performed e.g. for maintenance or repair purposes.

The critical propagation delay can be regarded as being the longest test propagation delay 2' that the clock period T may comprise, knowing that within this period T a tolerance delay 3' (which is the constant minimum margin mMg shown in FIG. 6) should preferably be maintained. The critical propagation delay is reached when the error generator 26 outputs an error E during the calibration mode. Indeed, if the programmable length datapath 22 is extended, step by step, during the calibration mode, there is point where this datapath is too long for a given clock period T, thus causing a time violation (as shown in FIG. 2). Knowing where is located the critical point beyond which a time violation occurs, it becomes possible to adapt the programmable length datapath 22 of the test circuit 21, 21' in a way that the test propagation delay 2' plus a tolerance delay 3' may correspond to the clock period T or may be close to this clock period without exceeding it.

Once the programmable length datapath 22 has been adjusted as above, the calibration mode Mc ends and the test circuit 21, 21' can be switched into its detection mode Md. In the detection mode Md, the test circuit 21, 21' runs as calibrated at the end of the calibration mode Mc. Accordingly, the test circuit becomes especially sensitive to any perturbation 1 (beyond noise or jitter) which may be intentionally caused e.g. by a hacker on the power supply VDD of the logic circuit 10 for instance. After a certain time lapse, the test circuit 21, 21' may be switched again to its calibration mode Mc and the switches between these two operating modes can be repeated as long as necessary. The calibration and detection mode swapping is shown in FIG. 7. The time laps during which the test circuit works in its detection mode Md can be predetermined or may depend on a further parameter.

Preferably, switching (or swapping) from the calibration mode Mc to the detection mode Md is performed as soon as the calibration mode Mc is completed.

The above-described method is applicable using a single test circuit 21, 21'. However, when this test circuit listen for disturbances 1 during the detection mode Md, there is a risk that the calibration of this test circuit is out of date, especially if a malicious person intentionally acts on a PVT parameter (such as the temperature T for example) to extend the tolerance delay 3' thus making the test circuit uncalibrated again. There is also a risk that a side-channel attack occurs during the calibration mode of the test circuit. In such a mode, the test circuit is unable to detect any perturbation given that it is temporarily busy with the calibration phase.

To overcome this drawback, the present solution suggests an embodiment in which the logic circuit 10 further comprises a second test circuit 21', as schematically depicted in FIG. 7. Preferably this second test circuit 21' is similar or identical to the first test circuit 21, still preferably the second test circuit 21' has at least the same capabilities and/or functions as the first test circuit 21. Typically, the first and the second test circuits 21, 21' have at least similar capabilities to both perform at least the same tasks, and are preferably configured to work simultaneously. More specifically, when one test circuit is in one mode, the other one is in the other mode. Accordingly, the test circuits 21 and 21' work simultaneously but with a time lag, i.e. with a time delay or time difference with respect to each other when considering the calibration mode Mc or the detection mode Md. Indeed, as shown in FIG. 7, when the first test circuit 21 is in the detection mode Md, the second test circuit 21' is in the calibration mode. In other words, the test circuits 21, 21' preferably never works in the same operating mode. Thanks to such an embodiment, there is always one test circuit 21, 21' which works in the detection mode. Accordingly, the logic circuit 10 is permanently protected against side-channel attacks since at any time there is one of the test circuits which is working in the detection mode for detecting any perturbation or disturbance.

It should be noted that the critical propagation delay may also be regarded as being the minimum delay for properly performing the required data operations in a datapath such as that of the test circuit. Accordingly, in another embodiment, varying the programmable length datapath 22, for determining the critical propagation delay, is stopped before this critical propagation delay is lower than a minimum delay for processing the data operations without perturbation. Indeed, if there is a critical propagation delay beyond which the digital signal 2 is too long and is therefore not stabilized at the end of the clock period T (thus causing a time violation), there is also a minimum delay required by the test circuit to properly calculate the result N from the inputs X, Y. This minimum delay is the shorten delay required by the test circuit 21, 21' for processing the operations under normal conditions. Accordingly, if the programmable length datapath 22 must be shortened step by step during the calibration mode, such shortening is stopped before the aforementioned minimum delay is reached. Thanks to this precaution, the test circuit 21, 21' will always operate between two appropriate delays, namely between the aforementioned minim delay, which may e.g. be a half clock period, and the critical propagation delay which is typically close to the clock period T. From the foregoing, one can note that time violations are mainly caused by an inappropriate programmable length datapath setting.

Nevertheless, it should be noted that the aforementioned last embodiment operates as disclosed above in the case where the programmable length datapath 22 of test circuit 21, 21' is at least as long as the longest datapath 5 of the logic circuit 10 (assuming that the clock signal has the same frequency for the entire logic circuit 10). The longest datapath is the datapath, among those comprised in the logic circuit 10 (such as the datapaths 5 schematically shown in the upper part of FIG. 3) that takes the longest time to run through. In the case where the shortest length of the datapath 22 (which depends on the minimum delay required by the test circuit to properly calculate the result N) is shorter than the aforementioned longest datapath, there is a risk that the logic circuit 10 will not operate properly. Therefore, to avoid such an issue, it may be suitable to first determine the longest datapath 5 comprised in the logic circuit 10, so as to get a lower limit below which the programmable length datapath 22 cannot go. Such a lower limit may replace the aforementioned minimum delay required by the test circuit to properly calculate the result N, or more simply, such a lower limit may be considered as being this minimum delay. Such limit and/or minimum delay may be defined, e.g. in advance, as setting parameter(s).

One can note that determining the critical propagation delay may be regarded as an operation aiming to scan, from a nominal length, the entire range of the programmable length datapath 22 which may vary from a minimum length to a maximum length. The nominal length may be located anywhere between the minimum and the maximum lengths of the datapath 22. This nominal length, may be defined e.g. from a predetermined value or from a previous value. Starting from this nominal length, if no error is outputs from the error generator e.g. despite the minimum length is reached, the process may be configured to automatically search for the critical propagation delay towards opposed length, i.e. the maximum length in this example. The datapath 22 must be at least as long as to cover delay range of datapath 5 to the clock period, and this in BCS condition (fastest condition) to cover all ranging operating cases.

According to a further preferred embodiment, the above-described method comprises iterations i for iterating over time the calibration and detection modes. In other words, these iterations allow iterating over time the determining, adjusting, switching and detecting steps of these operating modes. FIG. 7 schematically shows some iterations i, especially the iterations $i_1, i_2, \ldots i_n$ undertaken during the detection mode Md. To better distinguish two successive operation modes, the iterations present in the calibration mode Mc have been omitted in this Figure. Thanks to these iterations, the process aiming to verify (at each round) if an error E is output from the error generator 26 is repeated as long as the test circuit 21, 21' works in the same operating mode. Such repetitions are undertaken not only for the detection mode Md, but also for the calibration mode Mc. In addition, it should be noted that the number of successive iterations i for one mode is not necessarily the same for the other mode. It also means that the speed for completing one iteration may be different from one mode to the other. Preferably and according to the above disclosed method, the calibration mode Mc can be regarded as the master mode, whereas the detection mode Md may be considered as a slave mode that only runs after the calibration mode of one of the test circuits 21, 21' is completed. In the event that there is a single test circuit 21, the detection mode may be performed during a predetermined or limited time interval that may be set as setting parameter.

According to one embodiment, the programmable length datapath 22 is formed by a plurality of elements 23 to be included within one clock cycle, namely within one period T of the clock signal 4. As schematically depicted in FIG. 8, these elements 23 may typically be delay cells. If the test undertaken by the comparator 25 is positive and shows that the programmable length datapath 22 can be further extended, the value provided to the result register 27 will be positive. This positive result is transmitted to a controller 28 configured to manage a so-called trim register 29. The trim register is in charge of selecting the appropriate number of elements 23, to better adjust the programmable length datapath 22 within the clock cycle. This adjustment may consist of adding or withdrawing delay cells depending on the current size of the remaining empty slack or margin, as shown between times $t_3$ and $t_2$ in FIG. 4.

This adjustment is performed step by step during the iterations i. For instance, if the programmable length datapath 22 at iteration i is still too short, the comparator 25 of the test circuit 21, 21' in its calibration mode Mc will provide a positive result "1" in the result register 27. Accordingly, via the trim register 29, the controller 28 will further extend the programmable length datapath 22, e.g. by adding at least one element 23 to the datapath of the test circuit 21, 21'. At the next iteration i+1, the comparator 25 will verify if the newly extended datapath is long enough or not. If the programmable length datapath 22 causes a time violation, it means that it is too long. Therefore, the error generator 26 will provide an error E. Such information may be transmitted to the controller 28, especially in the case where the test circuit is in its calibration mode Mc. Accordingly, the controller 28 knows that the last adjusting step (i.e. the last extension in the present example) of the programmable length datapath must be removed in order to retrieve the datapath of the previous iteration (i) which therefore will correspond to the so-called critical propagation delay of the test circuit. As a result, the controller will adjust the programmable length datapath 22 accordingly, which will have the effect of including therein a tolerance delay 3'. It should be noted that retrieving the datapath of the previous iteration may be performed using a memory, e.g. a temporary storage unit, for storing the previous configuration (e.g. the number or elements 23) of the programmable length datapath 22.

According to one embodiment, the elements 23 of the programmable length datapath 22 are included according to a constant number during first iterations before increasing the number of elements to be included at the next iterations. For instance, during the first ten iterations $i_1$, $i_2$, $i_{10}$, a single element 23 may be added to the programmable length datapath 22 in an attempt to reach the critical propagation delay. If this critical propagation delay is still not reached, the controller 28 may increase the number of elements added to the datapath at each subsequent iteration. For example, the controller 28 may order to add two elements at iteration $i_{11}$, three elements at iteration $i_{12}$, four elements at iteration $i_{13}$, and so on until reaching the critical propagation delay. Accordingly, from a certain number of iterations, the increase in the number of elements varies and is preferably no more linear, but may be exponential. Advantageously, this embodiment allows to carry out the calibration phase more quickly, especially in the case where the empty slack is significant at the first iteration.

According to one embodiment shown in FIG. 9, the test propagation delay is adjusted by applying a so-called useful skew to a clock branch 4' coordinating the datapath generating the test propagation delay. Instead of being synchronized by a single clock signal 4, some portions of the logic circuit 10 may be synchronized by at least one clock signal derived from the main clock signal 4. Accordingly a clock tree may distribute, e.g. using several clock branches 4', clock signals to portions of the logic circuit 10. In the embodiment of FIG. 9, the clock signal 4 is provided through the clock branch 4' in order to coordinate the test circuit 21, 21', in particular the programmable length datapath 22 of this test circuit.

The purpose of the useful skew is to delay the instant $t_1$ where the inputs or operands X, Y are released from the registers 12a, 12b. Such a scenario is shown at the bottom of FIG. 4 in which this instant has been offset from time $t_1$ to time $t_{1'}$. Therefore, since the starting time $t_{1'}$ is delayed with respect to the rising edge of the clock signal 4 at the beginning of the clock period T, the end of the digital signal 2 will be moved towards the end of the clock period. Accordingly, the empty slack or tolerance delay 3' between times $t_3$ and $t_2$ will be smaller. This time interval ($t_3-t_2$) may be adjusted until it is equal or close to the minimum margin mMg which has been depicted in FIG. 6. The time interval shown in FIG. 4 between $t_{1'}$ and $t_1$ corresponds to the so-called useful skew.

The useful skew can be adjusted according to the architecture shown at FIG. 9 in which the programmable length datapath 22 is applied to the clock branch 4' in order to delay the rising edge of the clock signal 4 in this clock branch. As a result, the operands X, Y will be released at a later time $t_{1'}$, whereas the test propagation delay for performing the operations through the function F in the dedicated logic unit 24 remains unchanged. Adjusting the programmable length datapath 22 in the architecture of FIG. 9 may be performed in the same way as for the architecture of FIG. 8.

According to another embodiment illustrated both in FIGS. 8 and 9, the inputs X, Y of the test circuit 21, 21' are preferably swapped or changed in order to get different outputs N between two successive outputs. This can be shown through the multiplexers 12, 12' belonging respectively to the test circuits 21, and 21'.

Accordingly, the order of the operands X, Y can be swapped, as depicted through the crossed arrows, so that the function F can be either F(X,Y) or F(Y,X). Thanks to this feature, the result N issued from the function F calculated by the unit 24 will be different for each iteration i, therefore ensuring the presence of a digital signal 2 in the test circuit 21, 21' at each iteration.

Although two inputs X and Y, and therefore two expected results R1 and R2, have been disclosed in reference to FIGS. 8 and 9, it should be noted that this number is not limited to two. In addition, beyond two inputs, it should be noted that the number of expected results is not necessarily the same as the number of inputs, but may be greater than this number due to the different combinations that should be made, even using a limited number of inputs.

According to a second aspect, the present solution also refers to a logic circuit 10 for implementing the method according to any of its embodiments or any combination of these embodiments. To this end, this logic circuit 10 comprises at least one test circuit 21, 21'. This test circuit comprises means, such as a switching unit, for switching the calibration mode Mc into the detection mode Md and for switching the detection mode Md into the calibration mode Mc. The aforementioned switching unit may be a specific unit dedicated for switching operations, or may be the controller 28 shown on FIGS. 8 and 9.

More specifically, the logic circuit 10 comprises at least one test circuit 21, 21' configured to operate according to the calibration mode Mc and to the detection mode Md, the calibration mode Mc being designed to determine a critical propagation delay of a digital signal 2 through at least one of the datapaths 5, and the detection mode Md being designed to detect a perturbation 1 in the logic circuit 10.

Furthermore, the aforementioned test circuit 21, 21' comprises:
  first registers 12a, 12b configured to be loaded with inputs X, Y,
  a logic unit 24 storing a function F configured to provide an output N from the inputs X, Y,
  second registers 12c, 12d for storing expected outputs R1, R2 provided by the function F for the inputs X, Y,
  a comparator 25 configured to verify whether the output N is equal to one of the expected outputs R1, R2,
  an error generator 26 for outputting an error E in case the comparator 25 provides a negative event,
  a programmable length datapath 22 for varying a propagation delay 2' of the digital signal 2 allowing to get the output N from the input X, Y, and a switching unit for switching calibration mode Mc into detection mode Md and for switching detection mode Md into calibration mode Mc.

As explained in connection with the related method, determining the critical propagation delay of a digital signal 2 through the datapath 5 can typically be achieved by varying the programmable length datapath 22 until the error generator 26 outputs an error E.

According to a preferred embodiment, the logic circuit 10 further comprises a second test circuit 21' configured to achieve at least the same tasks as those of the first test circuit 21. In other words, the test circuits 21 and 21' have at least similar capabilities to both perform at least the same tasks. Preferably, the second test circuit 21' has at least the same capabilities and/or functions as the other test circuit 21' (i.e. the first test circuit 21). In addition, the test circuits 21, 21' are preferably configured for simultaneously working in one of the calibration mode Mc and detection mode Md, as schematically shown in FIG. 7. The manner in which the test circuits 21 and 21' work with respect to each other does not differ from that already explained in connection with the first aspect of the present solution. Besides, the characteristics and/or tasks relative to the first test circuit 21 are also applicable to the second test circuit 21'.

According to a preferred embodiment, the programmable length datapath 22 comprises a plurality of delay cells, especially a plurality of selectable delay cells. These delay cells are part of the elements 23 that are used to vary the length of the test circuit datapath. According to one embodiment, all the elements 23 used for this purpose are identical. Alternatively, a part of these elements 23 may be different from the other. For instance, some elements 23 may refer to delay cell providing a first delay, whereas other elements may refer to delay cells having a second delay different from the first delay. It should be noted that delay cells are taken as a non limitative example, so that other types of logical components having similar effects may also be considered as elements 23. In addition, there is no limitation to select the elements 23 one by one. Accordingly, several elements 23 could be simultaneously selected to vary the programmable length datapath 22. Furthermore, it should be understood that varying the programmable length datapath is not limited to extend the datapath of the test circuit, but also aims to shorten this datapath. Accordingly, a selection performed by the controller 28 via the trim register 29 may consist to remove at least one element 23 from the programmable length datapath 22 in order to shorten the test propagation delay.

According to another embodiment, the logic circuit 10 is limited to fully digital components. In other words, it means that the logic circuit 10 comprises only digital components. By dismissing any analog component, the present solution has the advantage of suggesting a very compact design which is especially convenient for being implemented in tiny space, such as smartcard for example. In addition, such a fully digital solution is also particularly economical, both in terms of production cost and electricity consumption.

According to another embodiment, the aforementioned fully digital components are limited to the test circuit 21, 21'. Accordingly, a solution to prevent side-channel attacks may be easily added to an existing analog or partially analog logic circuit 10.

It should be also noted that any embodiment or variant suggested in connection with the logic circuit may be also applied to the method disclosed previously.

Final Considerations

Although an overview of the inventive subject matter has been described with reference to specific example embodiments, various modifications and changes may be made to these embodiments without departing from the broader spirit and scope of embodiments of the present invention. For example, various embodiments of features thereof may be mixed and matched or made optional by a person of ordinary skill in the art. Therefore, the Detailed Description is not to be taken in a limiting sense, and the scope of various embodiments is defined only by the appended claims, along with the full range of equivalents to which such claims are entitled.

The invention claimed is:

1. A method for detecting perturbations in a logic circuit for processing data operations along a plurality of datapaths coordinated by a clock signal, at least one datapath having an operating propagation delay, said logic circuit further comprising at least one test circuit having a programmable length datapath for varying a test propagation delay, said at least one test circuit comprising first registers to be loaded with inputs, to be processed by a function configured to calculate a Boolean result from a computation using two operands to provide an output at an instant depending on the programmable length datapath, and an error generator for providing an error in case that the output is different than an expected output provided by the function for said inputs, wherein the expected outputs are stored in second registers and one of the first registers is connected to the programmable length datapath, and said at least one test circuit being configured to operate in two modes, a calibration mode and a detection mode, so as repeatedly switching between said calibration and detection modes, said calibration mode comprising:
determining a critical propagation delay by varying the programmable length datapath until the error generator outputs an error,
adjusting the programmable length datapath to include therein a tolerance delay,
switching into detection mode,
said detection mode comprising:
detecting a perturbation in the logic circuit along the programmable length datapath in case the error generator outputs an error,
the method comprising:
entering into the calibration mode and executing the steps of the calibration mode;
entering into the detection mode and executing the steps of the detection mode; and
detecting the perturbation as the result of the detection mode.

2. The method of claim 1, wherein the at least one test circuit comprises a first test circuit and a second test circuit, said second test circuit having at least the same capabilities as the first test circuit so as to both perform at least the same tasks, and wherein when one test circuit is in one mode, the other one is in the other mode.

3. The method of claim 1, wherein varying the programmable length datapath, for determining said critical propagation delay, is stopped before said critical propagation delay is lower than a minimum delay for processing said data operations without perturbation.

4. The method of claim 1, wherein said method comprises iterations for iterating over time the calibration and detection modes.

5. The method of claim 1, wherein said programmable length datapath is formed by a plurality of logic elements to be included within one clock cycle.

6. The method of claim 5, wherein said elements are included according to a constant number during first iterations before increasing a number of elements to be included at next iterations.

7. The method of claim 1, wherein switching from the calibration mode to the detection mode is performed as soon as the calibration mode is completed.

8. The method of claim 1, wherein said inputs of the test circuit are swapped or changed in order to get different outputs between two successive outputs.

9. The method of claim 1, wherein the test propagation delay is adjusted by applying a useful skew to a clock branch coordinating the datapath generating said test propagation delay.

10. A logic circuit for implementing the method of claim 1 while processing data operations along a plurality of datapaths coordinated by a clock signal, comprising at least one test circuit configured to operate according to a calibration mode and a detection mode, said calibration mode being designed to determine a critical propagation delay of a digital signal through at least one of said datapaths, and said detection mode being designed to detect a perturbation in the logic circuit, said at least one test circuit comprising:

first registers configured to be loaded with inputs, a logic unit storing a function configured to calculate a Boolean result from a computation using two operands to provide an output from the inputs, second registers for storing expected outputs provided by the function for said inputs, a comparator configured to verify whether the output is equal to one of the expected outputs, an error generator for outputting an error in case the comparator provides a negative event, a programmable length datapath for varying a propagation delay of the digital signal allowing to get the output from the input, wherein one of the first registers is connected to the programmable length datapath and a switching unit for switching calibration mode into detection mode and for switching detection mode into calibration mode.

11. The logic circuit of claim 10, further comprising a first test circuit and a second test circuit, said second test circuit having at least the same capabilities as the first test circuit so as to both perform at least the same tasks and being configured for simultaneously working in one of the calibration mode and detection mode.

12. The logic circuit of claim 10, wherein the programmable length datapath comprises a plurality of selectable delay cells.

13. The logic circuit of claim 10, wherein it is limited to fully digital components.

* * * * *